Dec. 12, 1972   JEAN-PIERRE CHABRERIE ET AL   3,705,995
HOMOPOLAR MACHINE WITH MULTIPLE DISCS AND A SHORT INDUCTOR
Filed Nov. 29, 1971                                    2 Sheets-Sheet 1

INVENTORS
JEAN-PIERRE CHABERIE
ALAIN JACQUES MAILFERT

BY *Strauch, Nolan, Neale, Nies & Kurz*
ATTORNEYS

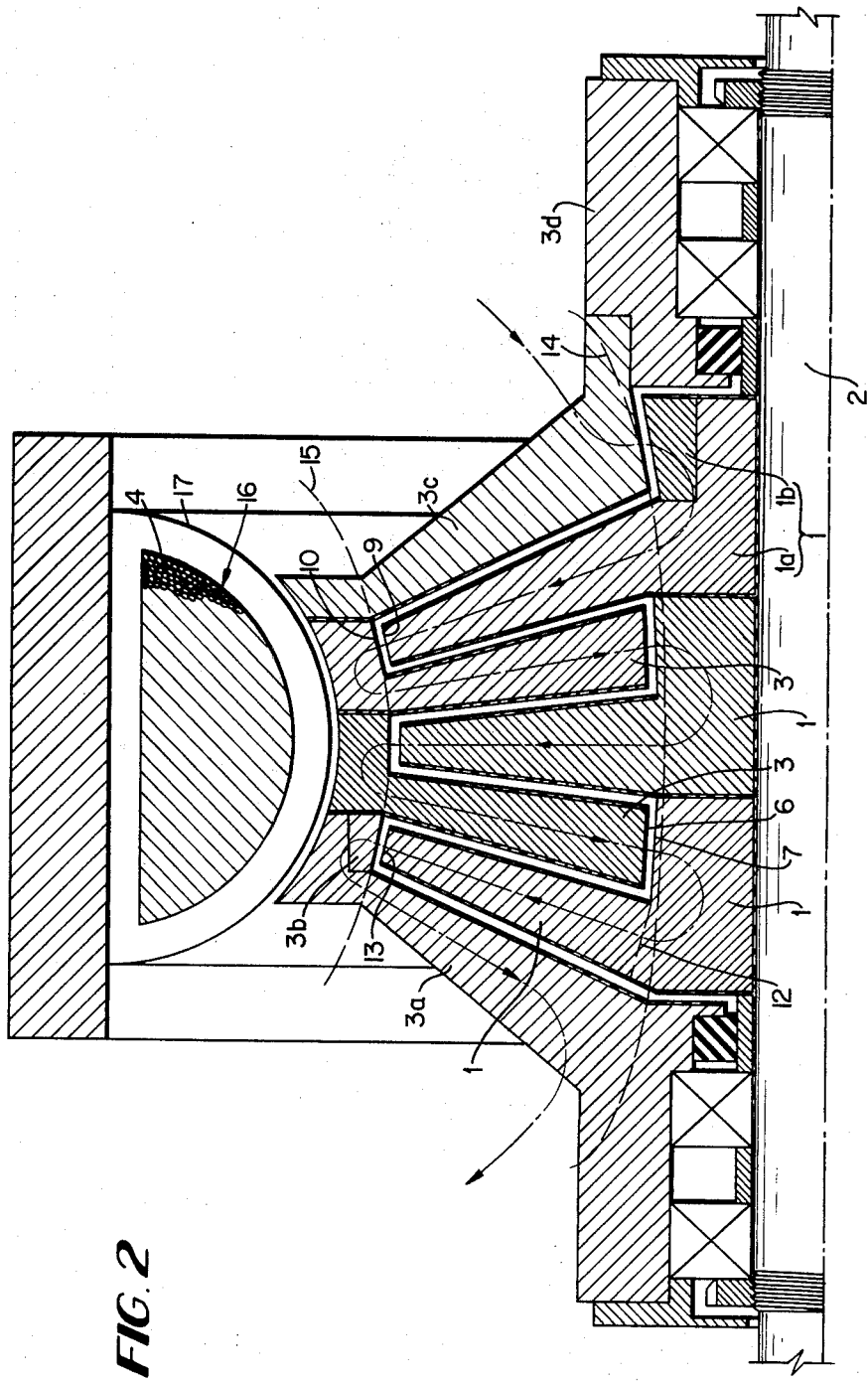

United States Patent Office 3,705,995
Patented Dec. 12, 1972

3,705,995
HOMOPOLAR MACHINE WITH MULTIPLE DISCS AND A SHORT INDUCTOR
Jean-Pierre Chabrerie, 55-1-08 Rue Saint Saens, Saint-Michel-S/Orge, France, and Alain Jacques Mailfert, 5 Av a Frauie, Aulnay-Sous-Bois, France
Filed Nov. 29, 1971, Ser. No. 202,757
Claims priority, application France, Nov. 30, 1970, 7042947
Int. Cl. H02k 31/04
U.S. Cl. 310—178                                    3 Claims

ABSTRACT OF THE DISCLOSURE

Homopolar machines with multiple discs and a short inductor. The homopolar machine has in combination with the short inductor discs and counter discs which decrease in thickness from the center toward the periphery thereof, the thickness at the periphery being equal to the thickness at the center reduced in inverse proportion to the corresponding radius therebetween. The inductor is preferably of the superconductor type, and its inner surface is at least in part of a toroidal configuration. The sliding contacts are preferably made by filling the machine with a liquid metal, and one or more of the contact surfaces may be truncated to facilitate assembly of the machine.

---

The invention relates to homopolar machines which function either as a generator or as a motor and, more especially, to machines of this kind with multiple discs and a short inductor.

In conventional multidisc homopolar machines, the rotating discs and the fixed counter discs have a constant thickness from their center to their periphery. This requires that the inductor have a length corresponding to the thickness or length of the assemblage of discs. This arrangement has the drawback of requiring a large amount of conductive metal in the movable discs and the counter discs. Also, this metal is not efficiently used because the current density continuously decreases from the center toward the periphery of the discs. Furthermore, the known arrangement requires a very large amount of metal for the inductor itself, which is particularly important when the inductor is made of an especially heavy super-conducting substance.

The object of the invention is to provide a homopolar machine having a weight, bulk and cost of manufacture substantially less than conventional machines due to elimination of the above-mentioned drawbacks of conventional homopolar machines.

The present invention combines, in a homopolar machine, a short inductor and movable discs and counter discs having a thickness that decreases from the center of the disc toward its periphery with the peripheral thickness of the disc being reduced from the thickness at the center in inverse proportion to the radial distance between the center and periphery of the disc. The conducting surfaces by which current transmission between the stationary discs and the movable discs is effected, and vice versa, are preferably surfaces of revolution having a generatrix which is a line of induction in the inductor field. The inductor is preferably of the superconductor type, and, internally, it has an at least partly toroidal surface configuration.

The contacts can advantageously be made by means of the technique known as liquid metal total filling. Other types of homopolar machines with superconducting inductors use solid, friction-type contacts. In these machines the contact surfaces must be aligned with the surfaces of the tubular fields created by the inductor as non-alignment of the contact surfaces leads to energy losses and substantial heating. One of the features of the present invention is the use of total filling contacts so designed that only one of the opposing solid surfaces which allow transmission of current need be aligned with the surface of magnetic field. The other surface should be aligned as closely as possible to a tubular field surface but can nonetheless be sufficiently separated therefrom to allow certain elements of the machine to be readily assembled. The applicants have been able to demonstrate that, in this case, the energy losses at the contact surface are no larger than those produced when the opposing contact surfaces are both aligned with the surfaces of the tubular fields.

To make the invention more readily understood, an embodiment of the invention will now be described as an example that is in no way intended to be limiting but is merely meant to be exemplary and to afford a comparison of the present invention with the present state of the art machines.

In the attached drawing:

FIG. 2 is an axial half section of a homopolar machine in accord with the present invention.

Figure 1:
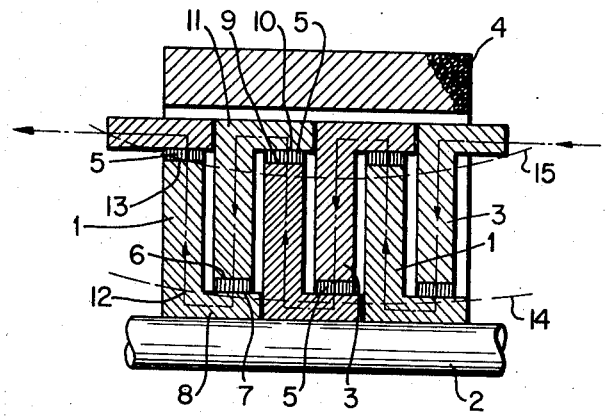
FIG. 1 shows schematically an axial half section of a conventional homopolar machine.

As shown in FIG. 1, a standard homopolar machine consists of a series of movable discs 1 rigidly connected to a shaft 2 and a series of fixed counter discs 3 surrounded by a magnetic inductor 4. A series of sliding contacts 5 provide electrical connections between the cylindrical surfaces 6 that inwardly delimit the fixed counter discs and the cylindrical surface 7 of hub 8, which extends to the next movable disc 1, and between the peripheral cylindrical surface 9 of each movable disc and the internal cylindrical surface of the projection 11 of the associated counter disc 3. The electrical current follows the path indicated by the arrow in FIG. 1.

The drawback of this arrangement is that, at the base 12 of each disc, the current flows across a relatively thin section equal to the thickness of the disc multiplied by the circumference of the disc at point 12. At the periphery 13 of the disc, the current passes across a section equal to the same thickness of the disc multiplied by the circumference at point 13, which is much greater than the circumference at point 12. The current density at point 12 limits the capacitance of the device; while, in the other sections of the disc, the metal is poorly utilized.

Furthermore, inductor 4 must have a length proportional to the thickness of the stack of discs and counter discs to be able to create lines of flux such as 14 and 15 which will effectively pass across the movable end disc and the counter disc. Moreover, the magnetomotive force of inductor 4 must be sufficient to produce return via the outermost of the flux lines, generally in air. Because of the foregoing factors, inductor 4 must have large dimensions which is a very serious drawback when the inductor is to be made of a superconductive material. Finally, the conducting surfaces such as 6 and 7 and 9 and 10 are generally not parallel to flux lines 14 and 15, especially at the extremities of the machine. As a result, the voltages at various points along the contacts 5 are not precisely uniform, and parasitic currents are consequently produced in the contacts.

The homopolar machine of the present invention illustrated in FIG. 2 also has a series of movable discs 1 rigidly connected to shaft 2 and a series of fixed counter discs 3. However, in this case, the thickness of each disc varies from the center toward the periphery of the disc and the discs do not have a flat planar configuration at the ends of the machine.

We again designate the section for the passage of electric current at the base of a rotating disc 1 as 12 and the section for current passage at the periphery of this disc as 13. The machine is so designed that the thickness of the disc at the periphery 13 is equal to the thickness at 12 reduced in inverse proportion to the radial distance between 12 and 13. The current density in sections 12 and 13 is therefore equal. It is possible to apply the same rule in all the intermediate sections of the disc, yielding curved generatrixes for the volume of revolution of disc 1. However, for simplicity, we define volume 1 by two straight lines. This produces in all the intermediate sections a current density that is only slightly less than the current density at 12 and 13. The same arrangement is used for fixed counter disc 3.

With this disc configuration, the inductor—still designated by numeral 4— is much shorter than the stack of discs 1 and 3 is thick near the center of the machine as shown in FIG. 2. Besides, this inductor is limited on the inside by a toroidal surface 16. In cases where inductor 4 is made of superconductive material, this smaller volume is an advantage because of the high price of this material.

Also, the toroidal form of inner surface 16 makes it possible to use a thin thermal insulation in that multiple insulation layers (here a double layer 17) separated by a space may be used because the toroidal surface readily resists internal and external pressures. This makes it possible to position the inductor extremely close to the peripheries of the counter discs.

Finally, the shape of the inductor results in lines of flux such as 14 and 15 which are sufficiently curved as to everywhere be practically normal to the various discs and counter discs.

To avoid energy dissipation to the greatest possible extent, the conducting surfaces, again respectively designated as 6 and 7 and 9 and 10, must be parallel to the corresponding lines of induction flux 14 and 15. However, this leads to difficulties in assembling the machine, making it necessary to fabricate some of the discs and counter discs in two pieces. For example, in FIG. 2 one of the discs 1 may have to be replaced by two pieces 1a and 1b which are assembled into a unit, and two counter discs 3 may have to be replaced by two pieces 3a and 3b assembled into a unit, and two piece 3c and 3d also assembled into a unit.

To avoid this complication, especially where the electrical connection between the conducting surfaces is effected by filling the spaces therebetween with an electrically conductive liquid metal, it is possible in the present invention to substitute for one of the two opposing surfaces 6 and 7 or 9 and 10 a surface which in relation to the surface of the inductor field differs from the type previously described. The wedge of liquid metal formed as a consequence between the opposed contact surfaces will be driven at practically the same speed as the wedge of solid metal it replaces. This results in only a very slight dissipation of energy; the dissipation is much lower than that which would occur if none of the opposing surfaces were parallel to the corresponding lines of induction.

Figure 3:
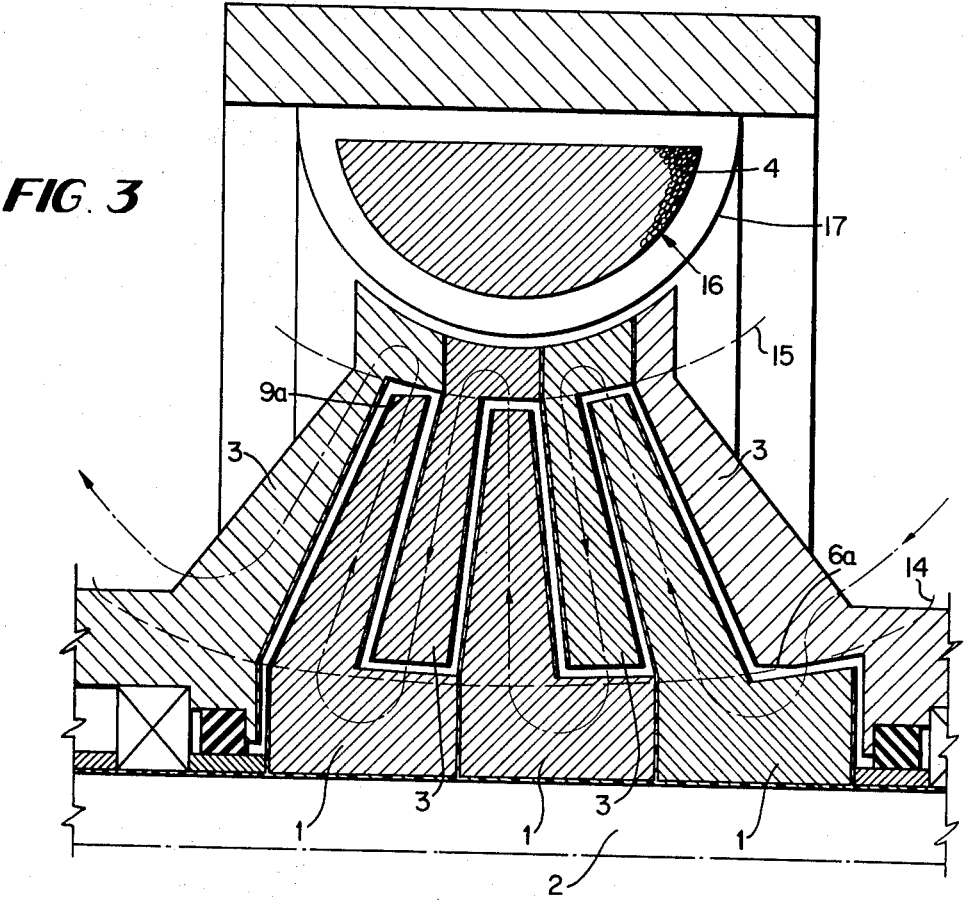
FIG. 3 is a similar section through a second form of homopolar machine in accord with the present invention.

FIG. 3 shows conducting surfaces thus modified and designated by reference characters 6a and 9a. Each of these surfaces has a part that is parallel to the line of induction joined to a part parallel to the axis of the machine. The latter part is cylindrical and has a radius that allows the machine to be easily assembled. Thus, all movable discs 1 and counter discs 3 can be made in a single piece, which greatly simplifies manufacture of the machine.

It is understood that the embodiment of the invention described above as well as the modification of it are not critical and that these can be modified in any way is deemed desirable without exceeding the scope of the invention.

What is claimed and desired to be secured by Letters Patent is:

1. A multiple disc homopolar machine comprising a plurality of movable discs and a plurality of fixed counter discs, characterized in that each movable disc and each counter disc has a thickness that decreases from the center toward the periphery thereof in such a way that the thickness at the periphery is equal to the thickness at the center reduced in inverse proportion to the radial distance therebetween and in that the inductor of the machine has a dimension in the direction of the axis of rotation of the machine that is less than the thickness of the stack of discs and counter discs in the vicinity of said axis.

2. A machine as in claim 1, characterized in that the inside of the inductor at least in part has a toroidal surface.

3. A machine as in claim 1, characterized in that the conduction of the electrical current between the opposing conducting surfaces is effected by filling the machine with a liquid metal, and in that, for all discs or counter discs for which there are difficulties in assembling because of the inclination of the conducting surfaces, one of the said surfaces is a cylindrical surface having a diameter sufficient for assembling, the other surface of the disc being parallel to the corresponding line of induction.

References Cited

UNITED STATES PATENTS

| | | | |
|---|---|---|---|
| 523,998 | 8/1894 | Rennerfelt | 310—178 X |
| 645,943 | 3/1900 | Dalen et al. | 310—178 |
| 742,600 | 10/1903 | Cox, Jr. | 310—178 |
| 861,192 | 7/1907 | Mathiesen | 310—178 |
| 2,845,559 | 7/1958 | Schwab et al. | 310—219 X |
| 3,295,091 | 12/1966 | Von Mossin | 310—219 X |

DONOVAN F. DUGGAN, Primary Examiner

U.S. Cl. X.R.

310—219